United States Patent Office 3,067,270
Patented Dec. 4, 1962

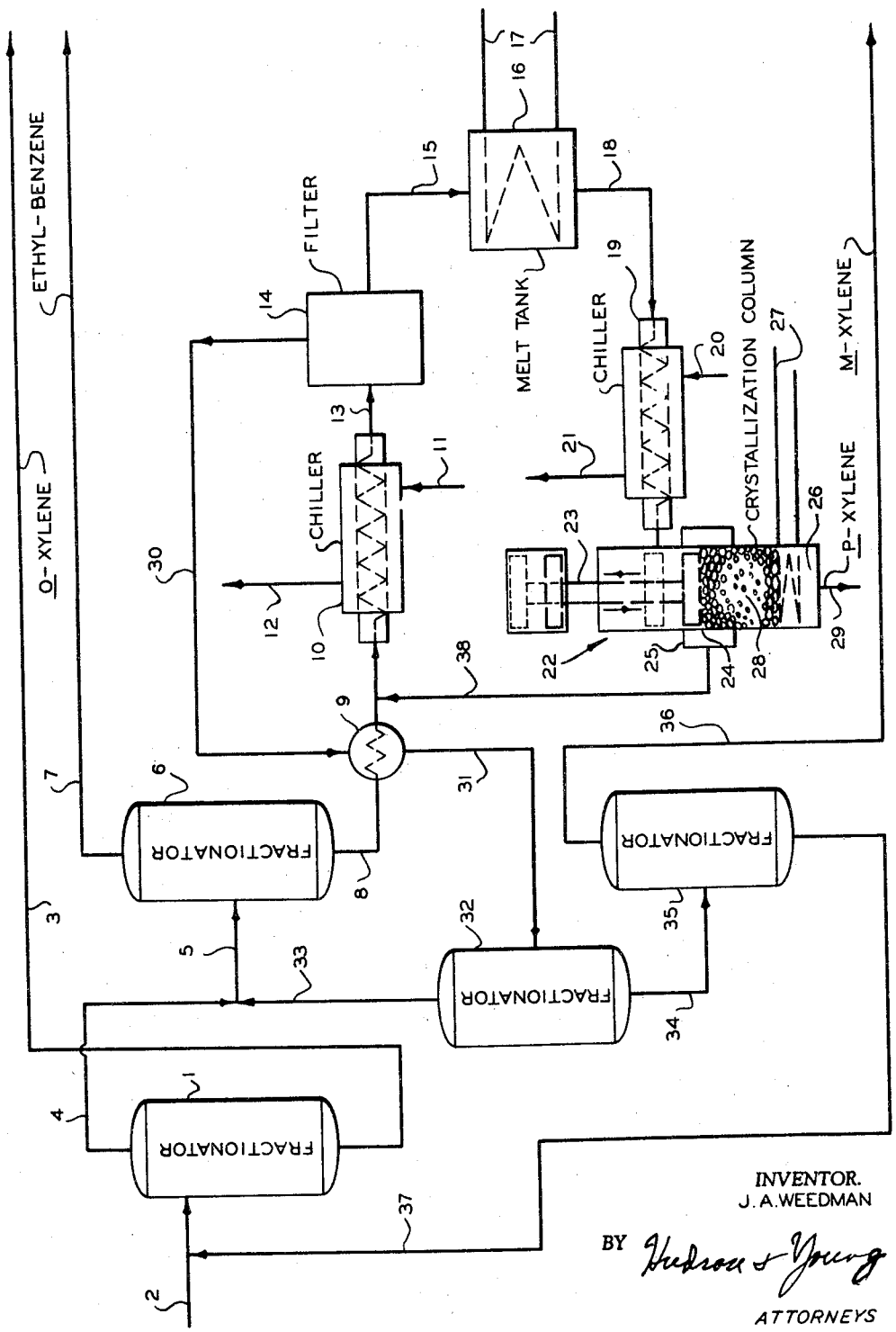

3,067,270
SEPARATION OF XYLENE ISOMERS BY CRYSTAL-
LIZATION AND DISTILLATION
John A. Weedman, Bartlesville, Okla., assignor to Phillips
Petroleum Company, a corporation of Delaware
Filed Dec. 19, 1958, Ser. No. 781,578
9 Claims. (Cl. 260—674)

This invention relates to xylene separation. In one of its aspects, this invention relates to separation of meta-xylene from para-xylene by a combination of crystallization and fractionation.

Petroleum xylenes are now available in many refineries as a result of catalytic reforming operations. The xylene fraction comprises ortho-xylene, meta-xylene, para-xylene and ethylbenzene. The compounds are useful as follows:

Ethylbenzene to make styrene for polystyrene, synthetic rubber and the like.

Para-xylene to make terephthalic acid for synthetic fibers, such as Dacron and terylene, plastics, etc.

Meta-xylene, a source of isophthalic acid for polyester plastics, paint vehicles, etc.

Ortho-xylene, a substitute for naphthalene in phthalic acid manufacture which is an intermediate for alkyd resins used in surface coatings.

These compounds have the following boiling and freezing poinst:

| Compound | B.P., °F. | F.P., °F. |
|---|---|---|
| Ethylbenzene | 277.14 | −138.96 |
| Para-xylene | 281.03 | 55.87 |
| Meta-xylene | 282.39 | −54.17 |
| Ortho-xylene | 291.95 | −13.33 |

From these data, it can be seen that separation by distilling of meta- and para-xylene would be extremely difficult and would require a very large number of trays, e.g., about 800 and on a 2 ft. spacing would require a column 1600 ft. high. On the other hand, crystallization does appear to be a feasible means of separating these two components and this method has been commercially used. However, at a temperature of −63° F., with a binary mixture of para-xylene and meta-xylene a eutectic having a composition of 13 mol percent para-xylene and 87 mol percent meta-xylene is formed so that only one component is readily separated in pure form. To illustrate: maximum recovery of para-xylene from a 30–70 mol mixture of para-xylene and meta-xylene is obtained by cooling to −63° F. with a 65 percent yield of the contained para-xylene as crystals. In general, the crystallizer will be operated to lower the mother liquor temperature to within 5% F. of the eutectic temperature for maximum recovery of para-xylene. While the use of a eutectic depressant has been proposed in an extractive crystallization to take the mixture to the other side of the normal eutectic point, followed by removing the depressant, and then crystallizing meta-xylene, this method has not been used commercially due to the very high cost required for refrigeration, especially at the low temperatures required. This cost is multiplied since the depressant is ordinarily removed by fractionation and meta-xylene then separated by crystallization. I have now found a method of separating such component systems whereby simple fractionation and ordinary crystallization are employed.

It is an object of this invention to provide a method for increasing the amount of para-xylene which can be recovered in high purity from a mixture of para- and meta-xylenes without the use of eutectic depressants.

Another object of this invention is to provide a method of separating a mixture of ethylbenzene, ortho-, para- and meta-xylene into separate streams of high purity.

Other objects, features and advantages of this invention will be obvious to those skilled in the art having been given this disclosure.

According to this invention, a stream comprising ortho-xylene, meta-xylene and para-xylene wherein the para-xylene to meta-xylene mol ratio is greater than 13:87 is cooled to crystallize para-xylene, and the mother liquor is subjected to fractional distillation to shift the said mol ratio from the eutectic. In a further embodiment wherein it is desired to upgrade the meta-xylene further, the bottoms from the fractionation zone is further fractional distilled to remove ortho-xylene which may be present.

This invention is applicable broadly to separating meta- and para-xylenes wherein the mol ratio of meta-xylene to para-xylene is less than 87:13, e.g., 80:20 or less. Such mixtures are generally obtained in admixture with ethylbenzene and/or ortho-xylene. The following table gives typical stream maximums and minimums of these components as ordinarily obtained. It is desirable to separate such fractions into separate streams wherein the ethylbenzene is recovered in at least 95 percent purity, the ortho-xylene in at least 95 percent purity, the para-xylene in at least 95 percent purity and the meta-xylene in at least 90 percent purity.

|  | Minimum | Maximum |
|---|---|---|
| Ethylbenzene | 20 | 35 |
| Ortho-xylene | 15 | 25 |
| Meta-xylene | 30 | 50 |
| Para-xylene | 15 | 25 |

It will be obvious that the stream can have either or both the ethylbenzene and ortho-xylene removed or can be enriched in any one or more components. The only requirement is that the meta-xylene to para-xylene ratio entering the crystallizer be such that para-xylene will crystallize out on cooling.

This invention will be further described with reference to the drawing which is a diagrammatic flow, showing how the various streams are treated according to the invention.

In the following discussion all pounds are based on 100 pounds feed. It will be understood by those skilled in the art that the temperature and pressure conditions are for this example only and that it is within the skill of the art to determine other pressures and temperatures. It is also within the skill of the art to provide pumps, valves, heaters, and the like as required. It will be obvious that the columns shown as single columns can be two or more columns in series if desired. For example, fractionator 1 can be two 75 tray columns and fractionator 6 can be divided into 4 columns.

The drawing will be described in conjunction with the separation of a stream, based on 100 pounds feed, comprising 25.0 percent ethylbenzene, 20.0 percent para-xylene, 35.0 percent meta-xylene and 20.0 percent ortho-xylene which is fed to fractionator 1 via conduit 2. This is a 150 tray fractionator and operates at 316° F. top temperature and 10 p.s.i.g. with a bottom temperature of 370° F. A stream, 20.1 pounds, consisting of 0.1 percent ethylbenzene, 0.4 percent para-xylene, 1.5 percent meta-xylene and 98.0 percent ortho-xylene is removed from the bottom of fractionator 1 and is passed to ortho-xylene storage, not shown, via conduit 3.

The overhead from fractionator 1, 83.9 pounds, consisting of 30.0 percent ethylbenzene, 24.0 percent para-xylene, 44.0 percent meta-xylene and 2.0 percent ortho-xylene, passed via conduits 4 and 5 to 350 tray fractionator 6. It will be noted that the overhead and bottoms from fractionator 1 total 104 pounds and this is due to the recycle stream of conduit 37 which is added to the 100 pound feed stream in conduit 2. Fractionator 6 operates at a top temperature of 315° F., 10 p.s.i.g. and a bottom temperature of 385° F. The overhead from this column (25.2 pounds) consisting of 99.0 percent ethylbenzene, 0.5 percent para-xylene, 0.5 percent meta-xylene and a trace of ortho-xylene is passed to ethylbenzene storage, not shown, via conduit 7.

The bottoms from fractionator 6, (80.5 pounds) consisting of 2.0 percent ethylbenzene, 33.2 percent para-xylene, 62.4 percent meta-xylene and 2.4 percent ortho-xylene passes via conduit 8 and heat exchanger 9 to scraped-surface chiller 10. This material enters the chiller at −10° F. and is cooled to −65° F. in chiller 10 where para-xylene is crystallized. The chiller is cooled by means of ethylene which is supplied via conduit 11 and removed via conduit 12. The crystals in mother liquor slurry pass via conduit 13 to rotary filter 14 where crystals, including occluded mother liquor, is separated from the bulk of the mother liquor. The crystals (35.2 pounds) pass via conduit 15 to melt tank 16 where the crystals are melted by heating to 40° F. by means of heat supply 17.

In order to remove the maximum amount of para-xylene from mother liquor in chiller 10, the temperature is lowered to a temperature near the eutectic temperature, however, crystals at this temperature are not readily handled in crystal purifier 22 and it is the practice to melt these crystals and refreeze. Since a larger percentage of the meta-xylene has been removed, the para-xylene is crystallized at a higher temperature at which it is easily handled in the crystal purifier.

The material is removed from melt zone 16 via conduit 18 and passed to scraped-surface chiller 19. This chiller is cooled with ammonia supplied via conduit 20 and removed via conduit 21. The crystals from chiller 19 pass to crystal-purifier 22. This purifier comprises a piston 23 which acts to press the crystals downward through the purifier comprising a filter 24; a collection zone 25; a melt zone 26; a heat supply 27 and a purification zone 28. The crystals as they pass into zone 26 are melted by heat supplied from supply means 27. A portion of the melted material refluxes upward through purification zone 28 where the melt washes the crystals free of uncrystallized material and carries these materials out through filter 24 to collection zone 25. Product (18.7 pounds) consisting of a trace of ethylbenzene and ortho-xylene, 98.5 percent para-xylene and 1.5 percent meta-xylene is removed via the conduit 29 and passed to storage, not shown.

The recycle material (16.5 pounds) consisting of 2.2 percent ethylbenzene, 35.0 percent para-xylene, 60.1 percent meta-xylene and 2.7 percent ortho-xylene passes via conduit 38 to conduit 8 where it joins the stream from column 6 and it it passed to chiller 10.

The mother liquor from rotary filter 14 (61.8 pounds) consisting of 2.6 percent ethylbenzene, 13.5 percent para-xylene, 80.8 percent meta-xylene and 3.1 percent ortho-xylene passes via conduit 30 to heat exchanger 9 where it takes heat from stream 8 cooling said stream 8 to −10° F. From these figures, it can be seen that the ratio of para- to meta-xylene is near the eutectic composition and this is the maximum purity at which meta-xylene is recovered by commercial methods or can be recovered without the use of eutectic depressants and extremely low temperatures.

According to this invention, the mother liquor stream is passed from cooler 9 via conduit 31 to a fractionation zone 32. In this example, a 200 tray fractionator is used. This fractionator operates under 10 p.s.i.g. pressure and top temperature of 318° F. with a bottom temperature of 367° F. The overhead from fractionator 32 (21.8 pounds) consisting of 8.0 percent ethylbenzene, 27.6 percent para-xylene, 64.4 percent meta-xylene and a trace of ortho-xylene is passsed via conduit 33 to conduit 5 where it joins the overhead from fractionator 1 in conduit 4 and passes to fractionator 6. It can be seen that the para-xylene to meta-xylene ratio has been changed significantly so that additional para-xylene can now be recovered. The bottoms from fractionator 32 (40 pounds) consist of a trace of ethylbenzene, 3.8 percent para xylene, 90.5 percent meta-xylene and 5.7 percent ortho-xylene. The product can now be recovered as 90 percent meta-xylene if desired. In this example, the meta-xylene purity is further improved by passing the bottoms from fractionator 32 via conduit 34 to 50 tray fractionator 35 which operates at 10 p.s.i.g., a top temperature of 318° F. and a bottom temperature of 337° F. The overhead from fractionator 35 (36 pounds) consisting of a trace of ethylbenzene, 4.0 percent para-ethylene, 95.0 percent meta-xylene and 1.0 percent ortho-xylene is passed via conduit 36 to meta-xylene storage, not shown.

The bottoms from fractionator 35 (4 pounds) consisting of a trace of ethylbenzene, 2.0 percent para-xylene, 50.0 percent meta-xylene and 48.0 percent ortho-xylene, is recycled via conduit 37 to conduit 2 where it is mixed with fresh feed and passed to fractionator 1.

From the above data, it is seen that 92 percent of the para-xylene in the feed is recovered as 98 percent para-xylene whereas only 69 percent is recovered by straight crystallization, the remainder going out with the meta-xylene.

This invention has been described in a preferred embodiment. The pressure, temperatures, etc., are not to be considered limiting but are typical for the particular system. Those skilled in the art can readily determine column requirements for making the required separations and will know that equivalent distillation means, such as packed columns can be substituted for the tray columns described. Filtering means, other than those shown are readily substituted by those skilled in the art. A purification column such as shown in U.S. Patent 2,854,494 or other such crystal purification columns can be used in place of column 22 if desired.

If the feed stream in conduit 2 is such that the para-xylene to meta-xylene ratio in conduit 4 is such that during the initial operation of the system the feed to crystallizer 10 contains less para-xylene than the eutectic composition, no para-xylene will be crystallized and the mother liquor will be the same as the feed to the crystallizer 10. This mother liquor will pass to fractionator 32 where the ratio of para-xylene to meta-xylene in conduit 33 will be increased until the feed in conduit 5 does contain more para-xylene than in the eutectic and from which para-xylene will crystallize in crystallizer 10.

I claim:

1. In the separation of meta-xylene from para-xylene contained in a stream comprising these xylenes by crystallizing para-xylene out of a solution having a mol ratio of para-xylene to meta-xylene greater than 13/87 and thereby approaching the para-xylene to meta-xylene eutectic, the improvement comprising distilling of the mother liquor from the crystallizer to separate a para-xylene rich fraction and a meta-xylene rich fraction and recycling the para-xylene rich fraction directly to said crystallizer.

2. The improvement of claim 1 wherein said para-xylene to meta-xylene mol ratio is greater than 20:80.

3. A process for separating a feed stream comprising ethylbenzene, o-xylene, m-xylene and p-xylene wherein the m-xylene to p-xylene mol ratio is less than 87:13 into component streams of high purity which comprises fractional distilling said stream into an o-xylene rich stream and a second stream enriched in the remaining components; fractional distilling the remaining components into an ethylbenzene rich fraction and a stream enriched in meta- and para-xylene; chilling the last said stream to a temperature approaching the meta-xylene to para-xylene eutectic; separating para-xylene crystals from mother liquor, fractional distilling said mother liquor to separate a meta-xylene rich stream and a para-xylene rich stream and recycling the para-xylene rich stream to the fractional distillation zone wherein the ethylbenzene enriched stream is separated.

4. The process of claim 3 wherein the meta-xylene rich stream is fractionally distilled into a stream further enriched in meta-xylene and a second stream which is returned to the first fractional distillation.

5. The process of claim 4 wherein the ortho-xylene rich stream comprises at least 95 percent ortho-xylene, the ethylbenzene rich stream comprises at least 95 percent ethylbenzene, the para-xylene crystals are melted, recrystallized and recovered as at least 95 percent para-xylene and the last said meta-xylene rich stream comprises at least 90 percent meta-xylene.

6. The process of claim 5 wherein the feed stream consists of 20 to 35 percent ethylbenzene, 15 to 25 percent ortho-xylene, 30 to 50 percent meta-xylene and 15 to 25 weight percent para-xylene.

7. The process of claim 6 wherein the said recrystallized para-xylene crystals are separated from occluded mother liquor and said mother liquor is recycled to the chilling operation.

8. In the separation of meta-xylene from para-xylene contained in a stream comprising these xylenes by crystallizing para-xylene out of a solution having a mol ratio of para-xylene to meta-xylene greater than 13/87, thereby approaching the para-xylene to meta-xylene eutectic, the improvement comprising distilling the mother liquor from the crystallization zone to obtain a para-xylene rich fraction and a meta-xylene rich fraction, recycling the para-xylene rich fraction to said crystallization zone, melting said para-xylene crystals from said crystallization zone, recrystallizing said para-xylene crystals in a second crystallization zone at a higher temperature than maintained in the initial crystallization zone, removing the occluded mother liquor from said recrystallized para-xylene crystals in a purification zone, recycling said occluded mother liquor to the initial crystallization zone.

9. The process of claim 8 wherein said meta-xylene rich fraction is fractionally distilled into a stream further enriched in meta-xylene and a second stream which is passed to a fractional distillation zone.

References Cited in the file of this patent

UNITED STATES PATENTS

| | | |
|---|---|---|
| 1,940,065 | Spannagel et al. | Dec. 19, 1933 |
| 2,383,174 | Weir | Aug. 21, 1945 |
| 2,389,793 | Livingston | Nov. 27, 1945 |
| 2,435,792 | McArdle et al. | Feb. 10, 1948 |
| 2,567,228 | Morrell et al. | Sept. 11, 1951 |
| 2,622,115 | Carney | Dec. 16, 1952 |
| 2,651,665 | Booker | Sept. 8, 1953 |
| 2,837,581 | Hill et al. | June 3, 1958 |
| 2,848,518 | Fragen | Aug. 19, 1958 |
| 2,890,252 | Cottle | June 9, 1959 |